(12) United States Patent
Kanzler

(10) Patent No.: US 6,843,540 B2
(45) Date of Patent: Jan. 18, 2005

(54) SPUR WHEEL FOR A CHAIN DRIVE ASSEMBLY

(75) Inventor: Helmut Kanzler, Voehringen (DE)

(73) Assignee: Käessbohrer Geländefahrzeug AG, Laupheim (DE)

( * ) Notice: Subject to any disclaimer, the term of this patent is extended or adjusted under 35 U.S.C. 154(b) by 19 days.

(21) Appl. No.: 10/318,757

(22) Filed: Dec. 13, 2002

(65) Prior Publication Data
US 2003/0201670 A1 Oct. 30, 2003

(30) Foreign Application Priority Data
Dec. 20, 2001 (DE) .......................... 101 63 968

(51) Int. Cl.$^7$ .......................... B62D 55/12; F16H 55/30; F16H 55/14
(52) U.S. Cl. .......................... 305/199; 305/195; 474/162
(58) Field of Search .......................... 305/193–195, 305/199; 474/162, 152, 155, 164

(56) References Cited

U.S. PATENT DOCUMENTS

| 3,136,171 A | * | 6/1964 | Nodwell ..................... 474/161 |
| 3,504,562 A | * | 4/1970 | Hirych ........................ 474/161 |
| 3,996,814 A | | 12/1976 | Westlake |
| 4,058,352 A | * | 11/1977 | Sogge ......................... 305/199 |
| 4,175,796 A | * | 11/1979 | Boggs et al. ................ 305/199 |
| 4,472,164 A | * | 9/1984 | Pusch et al. ................. 474/161 |
| 4,752,281 A | | 6/1988 | Lammers |
| 5,190,363 A | | 3/1993 | Brittain et al. |
| 5,456,527 A | | 10/1995 | Hilgers et al. |
| 5,829,850 A | | 11/1998 | Ketting et al. .............. 305/194 |

FOREIGN PATENT DOCUMENTS

| DE | 745 929 | 12/1944 | ..................... 63/30 |
| DE | 44 44 982 | 6/1995 | |
| EP | 0 384 567 B1 | 4/1992 | |

\* cited by examiner

Primary Examiner—Russell D. Stormer
Assistant Examiner—Jason R. Bellinger
(74) Attorney, Agent, or Firm—Greenberg Traurig

(57) ABSTRACT

A spur wheel for the chain drive assembly of a tracked vehicle on which the guide elements of a chain roll during the operation of the chain drive assembly is provided. Certain parts of the spur teeth which come in contact with the rolling area of the guide elements are designed as removable, replaceable parts.

4 Claims, 2 Drawing Sheets

SPUR WHEEL FOR A CHAIN DRIVE ASSEMBLY

THE BACKGROUND OF THE INVENTION

1. The Technical Field

The invention pertains to a spur wheel with spur teeth for a chain drive assembly of a tracked vehicle, on which teeth the guide elements of a chain roll during the operation of the chain drive assembly.

2. The Prior Art

Spur wheels for the chain drive assemblies of tracked vehicles are generally known. A chain drive assembly for a tracked vehicle, especially for a ski slope grooming vehicle, has a spur wheel on each side of the chassis, which functions as a drive wheel for the chain on each side. The spur wheel in question has the shape of a star or gearwheel and is driven by a hydraulic drive system. The spur teeth of the star-shaped or gearwheel-shaped spur wheel engage in positive fit with corresponding guide elements on the associated chain, which travels around the spur wheel. For this purpose, the spur wheel is preferably positioned on the first or last axle of the chain drive so that it is located at the reversal point of the chain. The positive engagement and the rolling of the guide elements of the chain on the spur teeth of the spur wheel cause the spur wheel and/or the guide elements of the chain to wear down. As a result, the driving comfort and operation of the chain drive assembly can be negatively affected.

SUMMARY OF THE INVENTION

The task of the present invention is to create a spur wheel of the type indicated above which makes it possible for the chain drive assembly to function satisfactorily and comfortably over a long period.

This task is accomplished in that certain areas of the spur teeth which come in contact with the rolling area of the guide elements are designed as removable, replaceable parts. The spur teeth of the spur wheel are therefore provided with replaceable parts in the areas susceptible to wear, which are the areas where the guide elements roll, i.e., the areas of the teeth on the circumference with which these guide elements engage. These replaceable parts can be replaced when they wear out without the need to replace the entire spur wheel. Thus, when it is necessary to renew the contact surfaces of the spur teeth on the spur wheel, the cost and the time required for such work is considerably reduced. The replaceable parts are preferably made of wear-resistant material.

In an elaboration of the invention, the replaceable parts are designed as separate, individual parts. All of the replaceable parts are preferably of the same design, so that only a single mold is required to produce them.

In a further elaboration of the invention, at least one fastening means is provided to attach the replaceable parts to the spur teeth. The replaceable parts can be held in place on the spur teeth either by separate fastening means or by a single, common fastening means.

In a further elaboration of the invention, a locking rim, which holds all of the replaceable parts in place jointly, is provided as the fastening means, which is detachably connected to the spur wheel. The locking rim is in working connection with all the replaceable parts. The locking rim preferably secures the replaceable parts against an opposing stop permanently attached to the spur wheel.

In a further elaboration of the invention, the replaceable parts are located in the bottom land areas between the tips of adjacent teeth. This design is based on the realization that the areas subjected to the most wear are the areas at the bottoms of the gaps between the spur teeth. By comparison, the tips of the teeth are subjected to practically no wear.

In a further elaboration of the invention, the replaceable parts can be slid parallel to the rotational axis of the spur wheel into the bottom land areas. After the replaceable parts have been pushed into working position, their surfaces are preferably flush and aligned with the surfaces of the tips of the adjacent teeth. The spur toothing is thus provided with recesses in the bottom lands between the tips of two adjacent teeth, so that the replacement parts in question can be slid parallel to the rotational axis of the spur wheel in positive fit between the tip sections of the teeth.

In a further elaboration of the invention, a positioning stop acting in the slide-in direction is provided for each replaceable part. With respect to the direction in which the replaceable parts are slid in, this positioning stop is preferably located at the rear of the associated recess, so that each replaceable part can be slid parallel to the rotational axis of the spur wheel up as far as the positioning stop, and when in this working position, the replaceable part will be flush on all sides with the adjacent sections of the spur wheel such as the tooth tip sections, the front end surface of the spur wheel, the positioning stop, etc.

In a further elaboration of the invention, the replaceable parts are connected to each other to form a single unit. The replaceable parts are preferably connected to a circumferential rim to form a single unit, which rim can be pushed coaxially onto the spur wheel in such a way that, as the rim is being pushed on, the replaceable parts simultaneously enter the associated recesses in the spur toothing.

BRIEF DESCRIPTION OF THE DRAWING

Additional advantages and features of the invention can be derived from the claims and from the following description of a preferred exemplary embodiment of the invention, which is illustrated additionally on the basis of the single FIG.

DETAILED DESCRIPTION OF THE INVENTION

Figure 1:
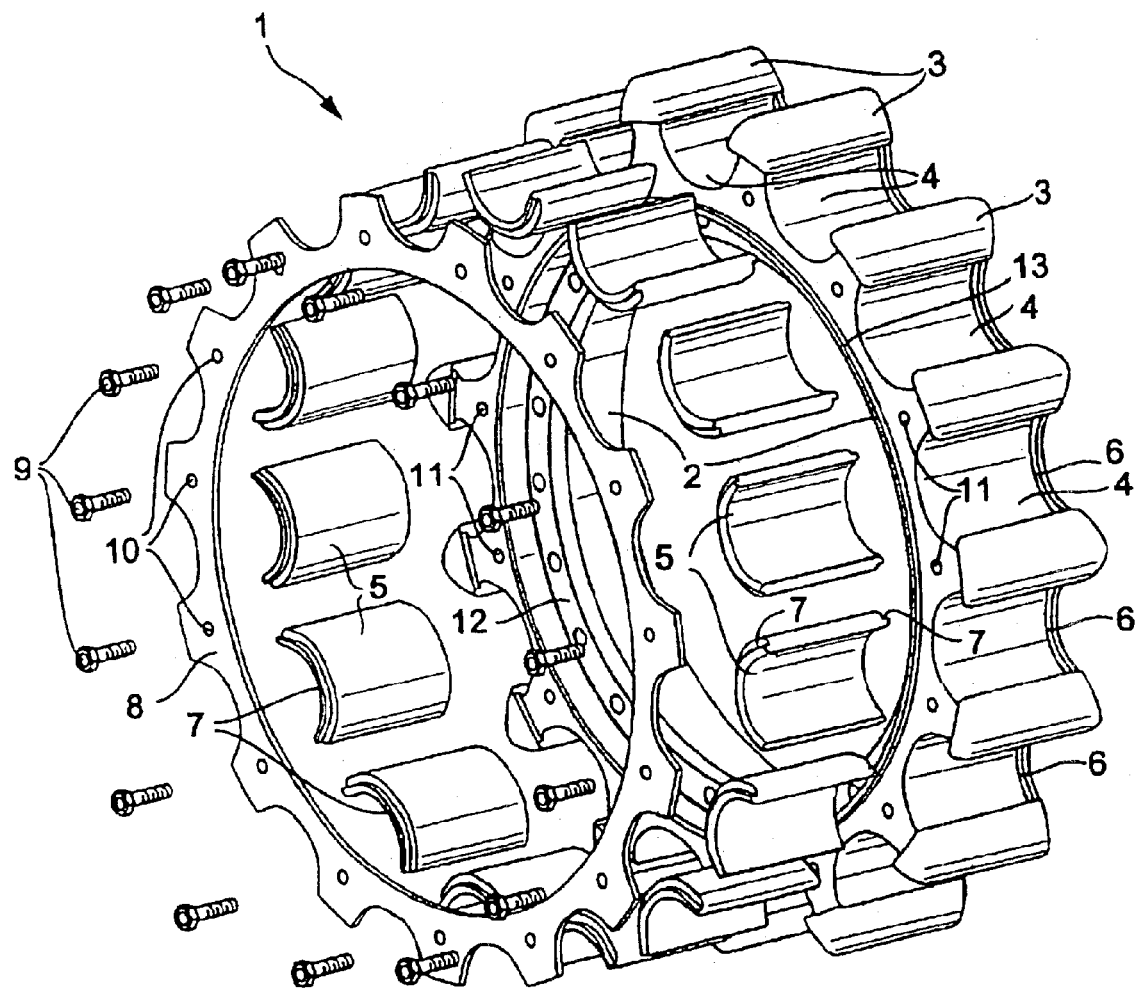
FIG. 1 shows an exploded view, in perspective, of an embodiment of a spur wheel according to the invention for a chain drive assembly of a ski slope grooming vehicle.
Figure 2:
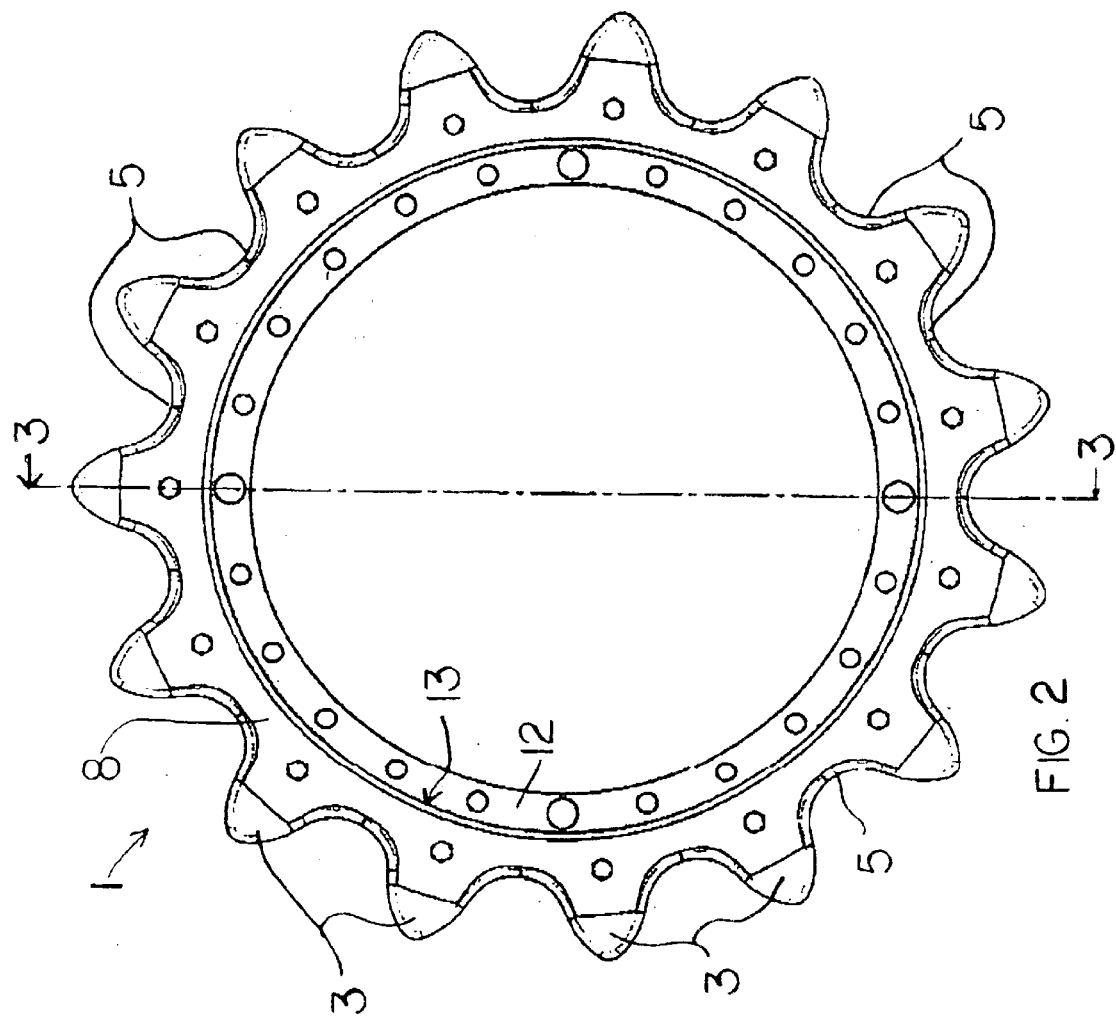
FIG. 2 shows a front elevation of the spur wheel in an assembled configuration.
Figure 3:
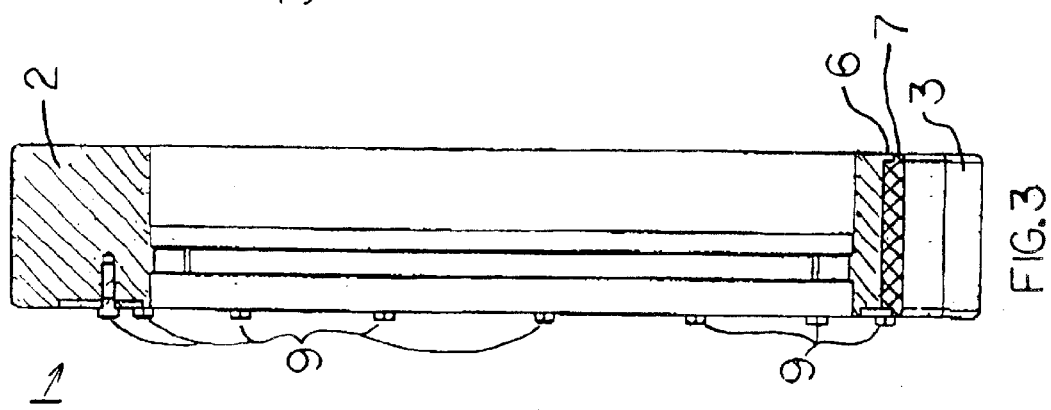
FIG. 3 shows a side section of the spur wheel of FIG. 2, as seen along lines 3—3 of FIG. 2.

A tracked vehicle in the form of a grooming vehicle for ski slopes has a chain drive assembly of the type basically known in and of itself, which is provided on each side with a chain, which serves to move the vehicle over the ground. Each chain is guided by means of several wheels on each side of the chassis. One of these wheels, preferably the one on the axle with is either first or last in the travel direction, is intended to serve as the drive wheel for the chain in question and is designed as a spur wheel 1. The corresponding spur wheel for each chain is positioned at the reversal point of the chain so that the chain will wrap around approximately half of the circumference of the spur wheel 1.

To achieve positive engagement between the chain and the spur wheel and thus to ensure the secure and uniform transmission of the drive force from the spur wheel to the chain, the spur wheel 1 is provided around its outside circumference with spur toothing 3–5, which is described in greater detail below. In a manner known basically in and of itself, the corresponding chain has guide elements, which, as the chain reverses direction around the spur wheel, engage in the spur teeth and thus allow the spur wheel 1 to drive the chain in a positive manner.

The spur toothing of the spur wheel 1 has, first, a plurality of tips 3 and, second, a plurality of bottom lands 4, located between the tips. The spur toothing is ring-shaped and is provided around its inside circumference with a ring-shaped flange 12. The ring-shaped flange 12 is provided with a plurality of fastening holes (not numbered), by means of which the spur toothing 3–5 and the ring-shaped flange 12 can be attached to the hub of the spur wheel 1.

The tips 3 of the spur teeth are designed in the shape of caps with step-like shoulders projecting out over the bottom lands 4. As a result, a trough-like recess is formed in each bottom land 4. The step-like shoulders of the cap-like tips 3 form the boundaries of these recesses at the top of the flanks.

Shell-like replaceable parts 5 can be inserted into the recesses in the bottom lands 4. The replaceable parts 5 are made of wear-resistant material, preferably of a wear-resistant plastic. Their shape is designed so that they bed down smoothly in the trough-like recesses in the bottom lands 4 and so that their surfaces are flush and aligned with the surfaces of the adjacent tips 3. After the replaceable parts 5 have been inserted into the bottom lands 4, a continuous, flush transition is obtained between the surfaces of the tips 3 and the surfaces of the replaceable parts.

The replaceable parts can be slid parallel to the rotational axis of the spur wheel 1 from the common, front-end surface into the corresponding recesses of the bottom lands 4 with a slight amount of play. At the rear, a positioning stop 6 in the form of the edge of a web is assigned to each bottom land 4, this stop being either an integral part of the spur toothing or a part connected permanently to it in some suitable way. Each replaceable part 5 is equipped with a contact web 7 both at its front edge and also at its rear edge. Each replaceable part 5 is symmetric in design, so that it can be pushed in the same way into the appropriate recess from either side. After the replaceable part 5 has been slid in its working position, its contact web 7 overlaps the rear positioning stop 6 of the associated bottom land 4.

On the front surface of the spur toothing opposite the positioning stop 6, a locking rim 8 is provided, which has a corresponding spur tooth contour, and which secures the replaceable parts 5 in the axial direction and locks them in place from the front surface of the spur toothing. The locking rim 8 has an inner circumference with a diameter which is designed to fit onto a ring-shaped shoulder 13 in the area of the spur toothing, so that, after the locking rim 8 has been pushed into its working position, it rests on this ring-shaped shoulder 13 and lies flush with it. The cap-like tips 3 also project slightly in the axial direction toward the front surface, the extent of this projection corresponding to the thickness of the locking rim 8. Tip contours of the locking rim 8 are matched in such a way to the pitch and shape of the cap-like tips 3 that the tip contours of the locking rim rest flush against the associated projecting sections of the tips 3. The bottom land contours of the locking rim 8 lying between the tip contours are matched to the radius of curvature of the stop webs 7 of the replaceable parts 5. The corresponding bottom land contours of the locking rim 8 therefore positively lock each replaceable part 5 in place and secure each part axially in place in the assembled state.

To install the locking rim 8, a plurality of fastening means in the form of fastening screws 9 is provided, which screws can be screwed into threaded holes 11 in the front end surface of the spur wheel 1. Corresponding through-openings 10 are provided in the locking rim 8 to receive the fastening screws 9.

To replace the replaceable parts 5, the locking rim 8 is easily detached and then pulled axially off the spur toothing. Then the replaceable parts 5 can be pulled out by hand axially from the corresponding recesses of the bottom lands 4 and replaced with new parts. These new replaceable parts are then fixed in place again in the same way by the locking rim 8 and the fastening screws 9.

What is claimed is:

1. A spur wheel with spur teeth for a chain drive assembly of a tracked vehicle, on which teeth the guide elements of a chain roll during the operation of the chain drive assembly, the spur wheel comprising:

certain parts of the spur teeth which are in contact with the rolling area of the guide elements being designed as removable, replaceable parts (5);

the replaceable parts (5) further being configured as separate, individual parts: and at least one fastening device (8, 9), provided to hold the replaceable parts (5) on the spur teeth;

wherein the at least one fastening device further comprises a locking rim (8), which holds all the replaceable parts in place jointly, this rim being detachably connected to the spur wheel (1).

2. The spur wheel according to claim 1, further comprising bottom lands, disposed between adjacent ones of the spur teeth, and outwardly projecting tips on the spur teeth, wherein the replaceable parts (5) are located in the bottom lands (4) between the tips (3) of adjacent teeth.

3. The spur wheel according to claim 2, wherein the replaceable parts (5) can be slid into the bottom lands (4) parallel to the rotational axis of the spur wheel (1).

4. The spur wheel according to claim 3, wherein a positioning stop (6) is provided for each replaceable part (5), for limiting the movement of the replaceable parts (5) in a direction parallel to the rotational axis of the spur wheel (1).

* * * * *